(12) United States Patent
Xu

(10) Patent No.: US 8,470,207 B2
(45) Date of Patent: Jun. 25, 2013

(54) NANO-POSITIVE ELECTRODE MATERIAL OF LITHIUM CELL AND METHOD FOR PREPARATION THEREOF

(76) Inventor: Ruisong Xu, Guangdong (CN)

( * ) Notice: Subject to any disclaimer, the term of this patent is extended or adjusted under 35 U.S.C. 154(b) by 326 days.

(21) Appl. No.: 12/865,357

(22) PCT Filed: Jun. 23, 2009

(86) PCT No.: PCT/CN2009/072394
§ 371 (c)(1),
(2), (4) Date: Jul. 29, 2010

(87) PCT Pub. No.: WO2010/139125
PCT Pub. Date: Dec. 9, 2010

(65) Prior Publication Data
US 2011/0114899 A1 May 19, 2011

(30) Foreign Application Priority Data
Jun. 2, 2009 (CN) .......................... 2009 1 0143905

(51) Int. Cl.
*H01B 1/02* (2006.01)
*B02C 17/00* (2006.01)

(52) U.S. Cl.
USPC ............... 252/519.15; 241/27; 252/182.1; 252/519.1; 429/221; 429/224; 977/700

(58) Field of Classification Search
USPC .. 241/27; 252/519.1, 519.15, 182.1; 429/221, 429/224; 977/700
See application file for complete search history.

(56) References Cited

FOREIGN PATENT DOCUMENTS
CN          1684290 A    * 10/2005

* cited by examiner

*Primary Examiner* — Bijan Ahvazi
(74) *Attorney, Agent, or Firm* — Chun-Ming Shih; HDLS IPR Services

(57) ABSTRACT

The present invention relates to a nano-positive electrode material of lithium cell and preparation thereof. And the material comprising Lithium iron phosphate as substrate, conductive doping ion and voltage-boosting doping ion, have the general chemical formula: $(Li_x[M_{1-x}])(Fe_y[N_{1-y}])PO_4$, wherein: $x=0.9\sim0.96$; $y=0.93\sim0.97$; M represents conductive doping ion; N represents voltage-boosting doping ion. The material is prepared by solid phase reaction, of which the process for preparation includes: all raw materials is mixed homogeneously-milled into powder-pellet-formed-isothermally sintered for 2~3 hours under 200~400° C. in inner atmosphere-cooled-milled into powder-pellet-formed-isothermally sintered for 15~20 hours under 500~780° C. in inner atmosphere-cooled-milled into powder-airflow grinded and classified. The method is of low production cost, easy to operate, environment friendly and of high yield. The nano-positive electrode material of lithium cell prepared by the solid phase reaction, wherein the conductivity is higher than $10^{-2}$ S/cm, and the actual discharge capacity>250 mAh/g. And it can be fast charged/discharged in high power. It is provided with the characteristic of low production cost, easy operation method, safety and environment friendly. And it is applicable to small polymer, gel and liquid lithium cell, especially to power cell with high power.

10 Claims, 2 Drawing Sheets

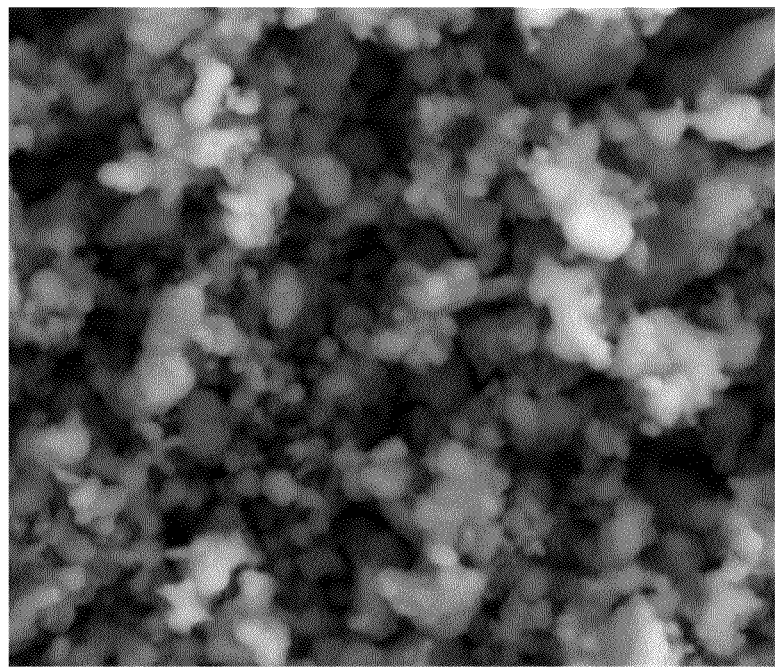
Fig. 1
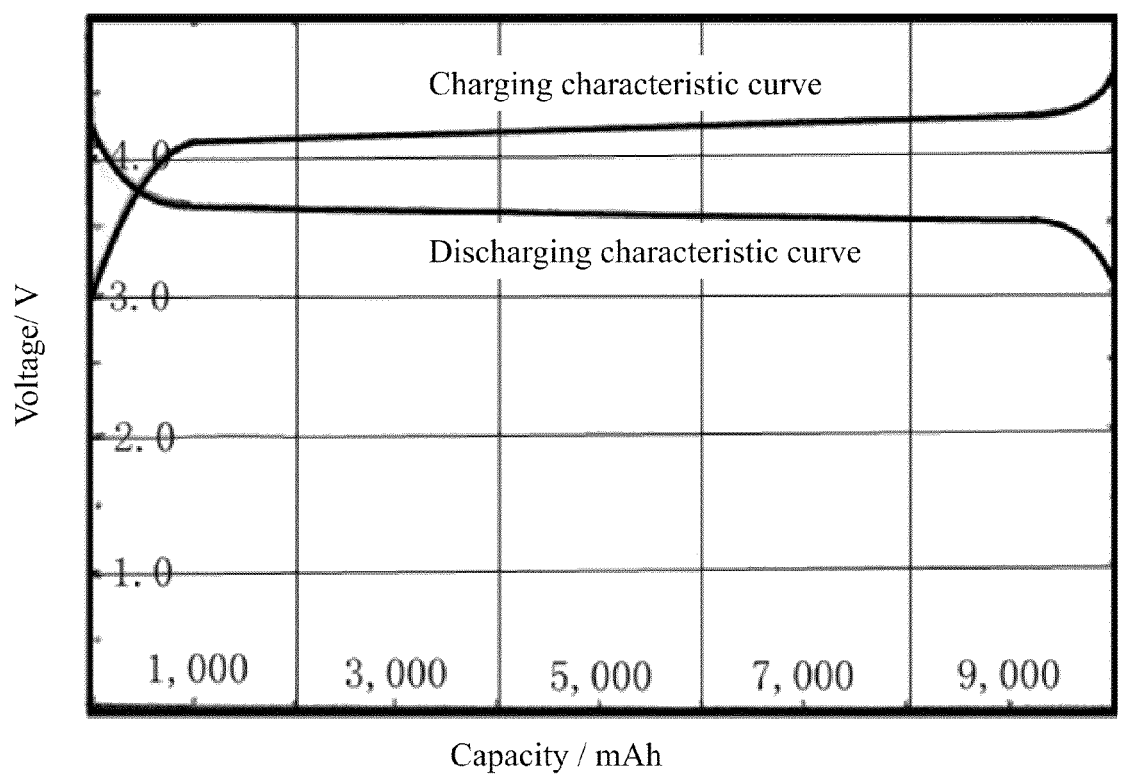

NANO-POSITIVE ELECTRODE MATERIAL OF LITHIUM CELL AND METHOD FOR PREPARATION THEREOF

FIELD OF THE INVENTION

The present invention relates to a nano-positive electrode material of lithium cell and method for preparation thereof. The material is used for polymer, gel and liquid lithium-ion cell, and especially applicable to preparing power cell of high power.

BACKGROUND ART

Presently, three kinds of positive electrode material are commonly used in lithium cell, such as lithium cobalt oxide, lithium nickel cobalt oxide and lithium manganese oxide. Lithium cobalt oxide and lithium nickel cobalt oxide are oxide with hexagonal system layered rock-salt structure and electrons in lithium ion migrating in the octahedral lamellar spacing formed by O—Co—O, possessing higher conductivity and reversibility of intercalation-deintercalation of lithium ion. Lithium manganese oxide is an oxide with spinel three-dimensional structure, and electrons in lithium ion migrating in the octahedral cubic channel formed by O—Mn—O, possessing higher conductivity and reversibility of intercalation-deintercalation of lithium ion as well. These positive electrode materials are widely used in the present lithium cell industry. However, metal cobalt is one of the rare elements on the earth and possesses radioactivity, and its oxide will violently react with electrolyte when the cell is over-charged or over-discharged, thereby releasing large quantity of heat which will cause the cell on fire until its explosion. Therefore, lithium cobalt oxide and lithium nickel cobalt oxide are of high manufacturing cost and low safety. Although lithium manganese oxide is cheaper and safer, its capacity is small, and its service life cycle under high temperature condition (above 55° C.) is short. The service life cycle of the lithium manganese oxide cell still fail to meet the practical demand even if it has undergone a doping and surface chemical treatment. Thus, in lithium cell industry, especially in high-power lithium cell, an environment-friendly and safe positive electrode material with low cost, large capacity is badly in need.

For this purpose, professor J. B. Goodenough etc. from University of Texas, USA (A. K. Padhi, K. S. Najundaswamy, C. Masgueslier, S. Okada and J. B. Goodenough, J. Eletrochem. Soc. 144, 1609-1613 (1997)) published an article in American Journal of Electrochemistry in 1997, disclosing a new lithium intercalating compound: lithium iron phosphate polycrystal $LiFePO_4$. The polycrystal possesses reversibility of lithium ion intercalation-deintercalation, of which the lithium ion electrons migrate freely in $FeO_6$ octahedral and $PO_4$ tetrahedron structure. Theoretical discharging capacity of the lithium iron phosphate polycrystal can reach 170 mAh/g, when 1 molar of lithium ion is deintercalating from the structure. Owing to the abundant lithium and iron reserve, manufacturing cost of lithium iron phosphate is low. It is predicted herein that since the lithium iron phosphate material is provided with various characteristics such as environment-friendly, safe, low cost and high performance, it may have great prospect of application in cell industry.

However, the conductivity of lithium iron phosphate in room temperature is extra-low ($10^{-9}$ S/cm), under normal discharging current ($10^{-1}$ mA/cm$^2$) condition, the actual capacity of lithium iron phosphate only accounts for 10% of the theoretical value (170 mAh/g). Thus, its application in cell is limited. In order to improve the conductivity of lithium iron phosphate, it is recently reported in article (Suag-Yoon Chang, Jason T. Bloking and Yetming Chiang, Nature, October 123-128(2002)) that after adding trace additives in the structure of lithium iron phosphate, such as Mg, Ti, Nb and Zr etc., the conductivity of lithium iron phosphate has been greatly improved in room temperature. However, the method of adding additives mentioned herein is complicated and the trace element is of high price, so it is not suitable for large-scale industrial production. Moreover, the room-temperature conductive space of lithium iron phosphate is larger, while its discharging voltage is lower, thereby affecting the energy density of the material.

SUMMERY OF THE INVENTION

The present invention provides a nano positive electrode material of lithium cell comprising lithium iron phosphate as substrate and conductive doping ion as well as voltage-boosting doping ion, and the method for preparation thereof to overcome the above shortcomings in prior arts. The nano positive electrode material of lithium cell provided in the present invention comprising lithium iron phosphate as substrate and conductive doping ion and voltage-boosting doping ion, have the general chemical formula: $(Li_x[M_{1-x}])(Fe_y[N_{1-y}])PO_4$, wherein x=0.9~0.96, y=0.93~0.97, M represents conductive doping ion, which is selected from the group consisting of $Mg^{2+}$, $Ca^{2+}$, $Sr^{2+}$, $Ti^{2+}$, $Al^{3+}$, $B^{3+}$, $Ce^{3+}$, $C^{4+}$, $Si^{4+}$, $Ge^{4+}$, $P^{5+}$, or combination thereof N represents voltage-boosting doping ion, which is selected from the group consisting of $Ti^{2+}$, $V^{5+}$, $Co^{3+}$, $Ni^{3+}$, $Mn^{2+}$, $Cr^{3+}$, $Cu^{2+}$, $Mo^{4+}$, or combination thereof.

Preferably, the particle diameter of the nano positive electrode material of lithium cell is 40~80 nm.

The present invention also provides the method for preparation of the nano positive electrode material of lithium cell comprising solid phase reaction, which includes the following steps:

a. Lithium dihydrogen orthophosphate, ferrous oxalate, glucose and conductive doping agent, as well as voltage-boosting doping agent are mixed homogeneously and then milled into powder.

b. The powder obtained from step a is pellet-formed, then it is isothermally sintered in inert atmosphere for 2~3 hours after heating up to 200~400° C.

c. The resulting material obtained from step b is taken out, milled into powder and then mixed homogeneously after cooling to room temperature.

d. The powder obtained from step c is pellet-formed, then it is isothermally sintered in inert atmosphere for 15~20 hours after heating up to 500~780° C.

e. The resulting material obtained from step d is taken out and milled into powder after cooling to room temperature.

f. The powder obtained from step e is ultramicro airflow grinded and classified.

Raw material proportion of the above nano-positive electrode material of lithium cell: The molar ratio of the raw material of lithium dihydrogen orthophosphate, ferrous oxalate, glucose, conductive doping agent and voltage-boosting doping agent is 1:0.98~0.99:0.069~0.07:0.04~0.1:0.029~0.07.

The conductive doping agent is selected from the group consisting of the compound of $Mg^{2+}$, $Ca^{2+}$, $Sr^{2+}$, $Ti^{2+}$, $Al^{3+}$, $B^{3+}$, $Ce^{3+}$, $C^{4+}$, $Si^{4+}$, $Ge^{4+}$ or $P^{5+}$, or combination thereof.

Preferably, the adding amount of the conductive doping agent is that the mole number of the conductive doping ion accounts for 4~10% of the total mole number of the lithium ion and the conductive doping ion.

The voltage-boosting doping agent is selected from the group consisting of the oxide of $Ti^{2+}$, $V^{5+}$, $Co^{3+}$, $Ni^{3+}$, $Mn^{2+}$, $Cr^{3+}$, $Cu^{2+}$, $Mo^{4+}$, or combination thereof.

Preferably, the adding amount of the voltage-boosting doping agent is that the mole number of the voltage-boosting doping ion accounts for 3~7% of the total mole number of the iron ion and the voltage-boosting doping ion.

The nano-positive electrode material of lithium cell provided in the present invention is added with cation of lower atomic weight and higher polarizability as conductive doping ion to improve its conductivity from $3\times10^{-9}$ S/cm to $1\times10^{-2}$ S/cm, increasing by $10^7$ times; simultaneously it is added with voltage-boosting doping ion to change the chemical potential of the lithium iron phosphate positive electrode material crystal structure to rise discharging voltage (ie. working voltage) increasing by 20~25%; In addition, the actual discharging capacity of the material is in excess of 250 mAh/g, and it can be high-rate charged/discharged and realize one-minute fast charge with charging service life over 4000 times. The material can not only be applied to small capacity cell, but also be more valuable when applied to high-power cell with large capacity of over 10 ampere. The present invention also provides the method for preparation of the above nano lithium cell, which possesses the characteristic of low production cost, easy operation, no pollution in production and high yield (>99%).

BRIEF DESCRIPTIONS OF THE DRAWINGS

FIG. 1 shows SEM micrograph of the nano-positive electrode material of lithium cell, magnification: 10,000; scale: 2.0 μm. The particle diameter of the material is 40~80 nm.

DETAILED DESCRIPTION OF THE EMBODIMENT

Figures 2, 3:
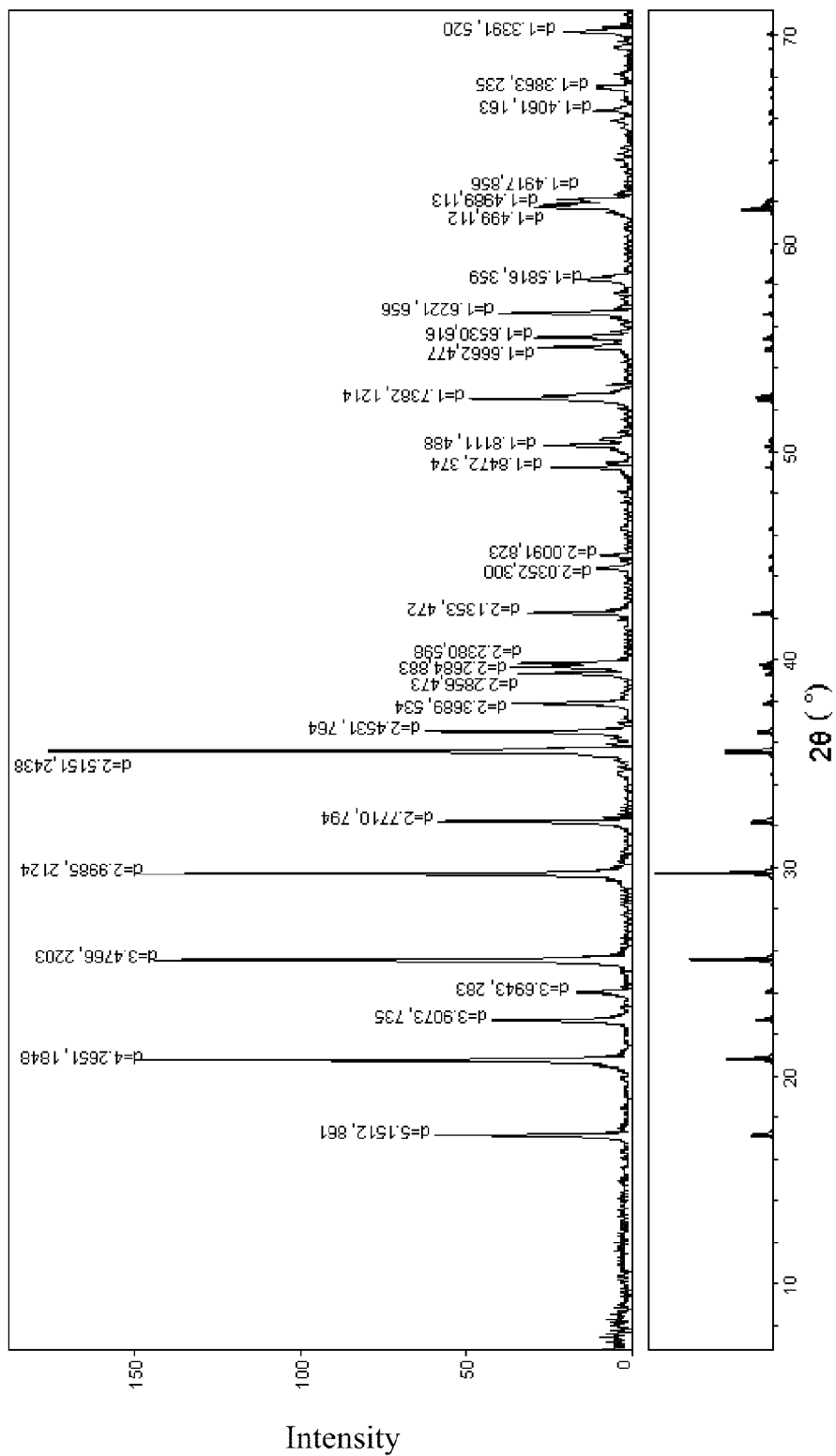
FIG. 2 shows Charging/discharging characteristic curve chart of the lithium cell prepared by the nano-positive electrode material of lithium cell.
FIG. 3 shows X-ray diffraction patterns of the nano-positive electrode material of lithium cell.

The scheme of the present invention is described in detail through the embodiments as follows.

Embodiment 1

In the first step, lithium dihydrogen orthophosphate 1000 g (9.62 mole), ferrous oxalate 1410 g (9.80 mole), glucose 120.5 g (0.67 mole), conductive doping agent of magnesium oxide 17 g (0.42 mole), as well as voltage-boosting doping agent of manganese phosphate 50 g (0.20 mole), cobalt carbonate 27 g (0.23 mole) and titanic acid 25 g (0.26 mole) are placed into ball mill to be milled and stirred for 2 hours into powder.

In the second step, the powder obtained from the first step is pellet-formed, after which it is put in aluminum oxide ceramic crucible, then isothermally sintered for 3 hours after heating up to 200~300° C. in a nitrogen furnace.

In the third step, after cooling to room temperature, the resulting material obtained from the second step is taken out, milled into powder, and mixed homogeneously In the fourth step, the powder obtained from the third step is pellet-formed, then it is isothermally sintered for 18~20 hours after heating up to 500~600° C. in a nitrogen furnace. The doped lithium iron phosphate crystal is then formed and naturally cooled to room temperature.

In the fifth step, the crystal pellet is milled into powder.

In the sixth step, the powder obtained from the fifth step is grinded and classified in ultramicro air flow grinder to prepare nano-positive electrode material of lithium cell, the particle diameter of which is 40~80 nm.

By measuring, the conductivity of current lithium iron phosphate is $3\times10^{-9}$ S/cm, while the room temperature discharging voltage of current lithium iron phosphate is 3.2V; whereas room temperature conductivity and discharging voltage of the nano-positive electrode material of lithium cell provided by the present invention are $1.30\times10^{-2}$ S/cm and 4.0V, increasing by $10^7$ times and 25%, respectively. separately.

Embodiment 2

In the first step, lithium dihydrogen orthophosphate 1000 g (9.62 mole), ferrous oxalate 1400 g (9.73 mole), glucose 120 g (0.67 mole), conductive doping agent of boric acid 20 g (0.32 mole), calcium phosphate 60 g (0.19 mole) and aluminum hydroxide 35 g (0.45 mole), as well as voltage-boosting doping agent of copper sulfide 30 g (0.31 mole) are placed into ZrO ball mill to be milled and stirred for 2~3 hours into powder.

In the second step, the powder obtained from the first step is pellet-formed, then it is placed into a aluminum oxide ceramic crucible and isothermally sintered for 1.5~2.5 hours after heating up to 300~400° C. in a nitrogen furnace.

In the third step, after cooling to room temperature, the resulting material obtained from the second step is taken out, milled into powder and mixed homogeneously.

In the fourth step, the powder obtained from the third step is pellet-formed, then it is isothermally sintered in a nitrogen converter for 15~16 hours after heating up to 700~800° C. The doped lithium iron phosphate crystal is then formed and cooled to room temperature naturally.

In the fifth step, the crystal pellet is milled into powder.

In the sixth step, the powder obtained from the fifth step is grinded and classified in ultramicro airflow grinder to prepare solid powder used in nano-positive electrode material of lithium cell, the particle diameter of which is 40~80 nm.

By measuring, the conductivity of current lithium iron phosphate is $3\times10^{-9}$ S/cm, and the room temperature discharging voltage of current lithium iron phosphate is 3.2V; whereas room temperature conductivity and discharging voltage of the nano-positive electrode material of lithium cell provided by the present invention are $1.35\times10^{-2}$ S/cm and 3.85V, increasing by $10^7$ times and 20%, respectively.

Embodiment 3

In the first step, lithium dihydrogen orthophosphate 1000 g (9.62 mole), ferrous oxalate 1400 g (9.73 mole), glucose 120 g (0.67 mole), conductive doping agent of meta-titanic acid 29 g (0.30 mole) and silicon dioxide 23 g (0.38 mole), voltage-boosting doping agent of basic nickel carbonate 70 g (0.15 mole) and molybdenum oxide 50 g (0.35 mole) are placed into ZrO ball mill to be milled and stirred for 2~3 hours into powder.

In the second step, the powder obtained from the first step is pellet-formed, then it is placed into a aluminum oxide ceramic crucible and isothermally sintered for 1.5~2.5 hours after heating up to 200~300° C. in a nitrogen furnace.

In the third step, after cooling to room temperature, the resulting material obtained from the second step is taken out, milled into powder and mixed homogeneously.

In the fourth step, the powder obtained from the third step is pellet-formed, then it is isothermally sintered for 16~17 hours after heating up to 650~750° C. in a nitrogen furnace. The doped lithium iron phosphate crystal is then formed and cooled to room temperature naturally.

In the fifth step, the crystal pellet is milled into powder.

In the sixth step, the powder obtained from the fifth step is grinded and classified in ultramicro airflow grinder to prepare solid powder of nano-positive electrode material of lithium cell, the particle diameter of which is 40~80 nm.

By measuring, the conductivity of current lithium iron phosphate is $3 \times 10^{-9}$ S/cm, and the room temperature discharging voltage of current lithium iron phosphate is 3.2V; whereas room temperature conductivity and discharging voltage of the nano-positive electrode material of lithium cell provided by the present invention are $1.35 \times 10^{-2}$ S/cm and 3.90V, increasing by $10^7$ times and 22%, respectively.

The nano-positive electrode material of lithium cell provided in embodiment 1~3 of the present invention can be fast charged/discharged in the rate of 1 C~12 C.

The present invention includes but not limit to the above embodiments. The embodiments mentioned above are only intended to understand the spirit of the present invention. Any modifications or alternations to the present invention within the spirits of the present invention, also belong to the protection scope of the present invention.

The invention claimed is:

1. A nano-positive electrode material of lithium cell comprising lithium iron phosphate as substrate and doped conductive ion and voltage-boosting doping ion having the general chemical formula: $(Li_x[M_{1-x}](Fe_y[N_{1-y}])PO_4$, wherein x=0.9-0.96, y=0.93-0.97, M represents conductive doping ion is selected from the group consisting of $Mg^{2+}$, $Ca^{2+}$, $Sr^{2+}$, $Ti^{2+}$, $Al^{3+}$, $B^{3+}$, $Ce^{3+}$, $C^{4+}$, $Si^{4+}$, $Ge^{4+}$, $P^{5+}$, and combination thereof; and N represents voltage-boosting doping ion is selected from the group consisting of $Ti^{2+}$, $V^{5+}$, $Co^{3+}$, $Ni^{3+}$, $Mn^{2+}$, $Cr^{3+}$, $Cu^{2+}$, $Mo^{4+}$, and combination thereof, wherein a particle diameter of the nano-positive electrode material of lithium cell is 40-80 nm.

2. A method for preparation of the nano-positive electrode material of lithium cell according to claim 1, wherein the method for preparation in which solid phase reaction is used, includes the following steps:
  (a). Providing lithium dihydrogen orthophosphate, ferrous oxalate, glucose, conductive doping agent, and voltage-boosting doping agent, mixing homogeneously, and then milling into powder;
  (b). Obtaining the powder from step (a) in pellet form, isothermally sintering for 2-3 hours after heating up to 200-400° C. in inert atmosphere;
  (c). Milling the obtained material from step (b) into powder, mixing homogeneously after cooling to room temperature;
  (d). Obtaining the powder from step (c) in pellet form, isothermally sintering for 15-20 hours after heating up to 500-780° C. in inert atmosphere;
  (e). Taking out the material from step (d), and milling into powder after cooling to room temperature;
  (f). Ultramicro airflow grinding and classifying the powder obtained from step (e).

3. The method for preparation of the nano-positive electrode material of lithium cell according to claim 2, wherein in step (a), a molar ratio of lithium dihydrogen orthophosphate, ferrous oxalate, glucose, conductive doping agent, and voltage-boosting doping agent is 1:0.98-0.99:0.069-0.07:0.04-0.1:0.029-0.07.

4. The method for preparation of the nano-positive electrode material of lithium cell according to claim 2, wherein in step (a), the conductive doping agent is selected from the group consisting of the compound of $Mg^{2+}$, $Ca^{2+}$, $Sr^{2+}$, $Ti^{2+}$, $Al^{3+}$, $B^{3+}$, $Ce^{3+}$, $C^{4+}$, $Si^{4+}$, $Ge^{4+}$, $P^{5+}$, and combination thereof.

5. The method for preparation of the nano-positive electrode material of lithium cell according to claim 3, wherein in step (a), an adding amount of the conductive doping agent, which is a mole number of the conductive doping ion accounts for 4-10% of a total mole number of the lithium ion and the conductive doping ion.

6. The method for preparation of the nano-positive electrode material of lithium cell according to claim 2, wherein in step (a), the voltage-boosting doping agent is selected from the group consisting of oxide, carbonate or phosphate of $Ti^{2+}$, $V^{5+}$, $Co^{3+}$, $Ni^{3+}$, $Mn^{2+}$, $Cr^{3+}$, $Cu^{2+}$, $Mo^{4+}$, and combination thereof.

7. The method for preparation of the nano-positive electrode material of lithium cell according to claim 2, wherein in step (a), an adding amount of the voltage-boosting doping agent, which is a mole number of the voltage-boosting doping ion accounts for 3-7% of a total mole number of the iron ion and the voltage-boosting doping ion.

8. The method for preparation of the nano-positive electrode material of lithium cell according to claim 2, wherein in steps (a), (c), and (e), ZrO is used in the step of ball milling into powder.

9. The nano-positive electrode material of lithium cell according to claim 1, wherein M is selected from the group consisting of $Mg^{2+}$, $Ca^{2+}$, $Sr^{2+}$, $Ti^{2+}$, $Al^{3+}$, $B^{3+}$, $Ge^{4+}$, $P^{5+}$, and combination thereof.

10. The nano-positive electrode material of lithium cell according to claim 1, wherein N is selected from the group consisting of $Ti^{2+}$, $V^{5+}$, $Mn^{2+}$, $Cr^{3+}$, $Cu^{2+}$, and combination thereof.

* * * * *